United States Patent [19]

Carver

[11] 4,424,697
[45] Jan. 10, 1984

[54] WHEEL MOUNTING SUSPENSION STRUT CAMBER CORRECTING TOOL

[76] Inventor: James L. Carver, 16324 Lauder La., Richardson, Tex. 75080

[21] Appl. No.: 305,576

[22] Filed: Sep. 25, 1981

[51] Int. Cl.$^3$ .............................................. B21D 1/12
[52] U.S. Cl. ........................................ 72/309; 72/704
[58] Field of Search .................. 72/447, 704, 705, 309

[56] References Cited

U.S. PATENT DOCUMENTS

| 1,850,073 | 3/1932 | Countryman | 72/705 |
| 2,151,063 | 3/1939 | Weaver | 72/705 |
| 3,034,564 | 5/1962 | Cavazos | 72/705 |
| 3,481,176 | 12/1969 | Horn | 72/704 |
| 3,906,777 | 9/1975 | Dickens | 72/705 |
| 3,980,275 | 9/1976 | Sanchez | 72/705 |
| 4,117,709 | 10/1978 | Jackson | 72/704 |
| 4,296,626 | 10/1981 | Jarman et al. | 72/704 |

Primary Examiner—Lowell A. Larson
Attorney, Agent, or Firm—Warren H. Kintzinger

[57] ABSTRACT

A wheel to wheel strut camber correcting tool including a heavy rigid frame channel body with wheel bolt openings to facilitate wheel bolt mounting of the channel body on a strut wheel mounting disk, and a reversible direction screw drive assembly mounted on the top of the channel body. The reversible direction screw drive assembly has a pivotal mount in parallel spaced mounting flanges for a rotationally fixed drive screw hub housing member rotationally mounting a drive nut. The drive nut is drivingly threaded to an elongated non-rotational bolt member having a strut attachment head constructed for being removably clamped to a strut. The elongated threaded body of the non-rotational bolt member is threadingly drawn back into a rotational tool drive housing with a wrench tool hexagonal drive end or threadingly driven outwardly dependent on the rotation of the drive housing and therewith the drive nut to thereby bend the strut and wheel spindle with the wheel mounting disk interconnect to correct excess positive or negative camber when a wheel to wheel strut interconnect has been bent out of alignment as by a severe bump or collision.

17 Claims, 3 Drawing Figures

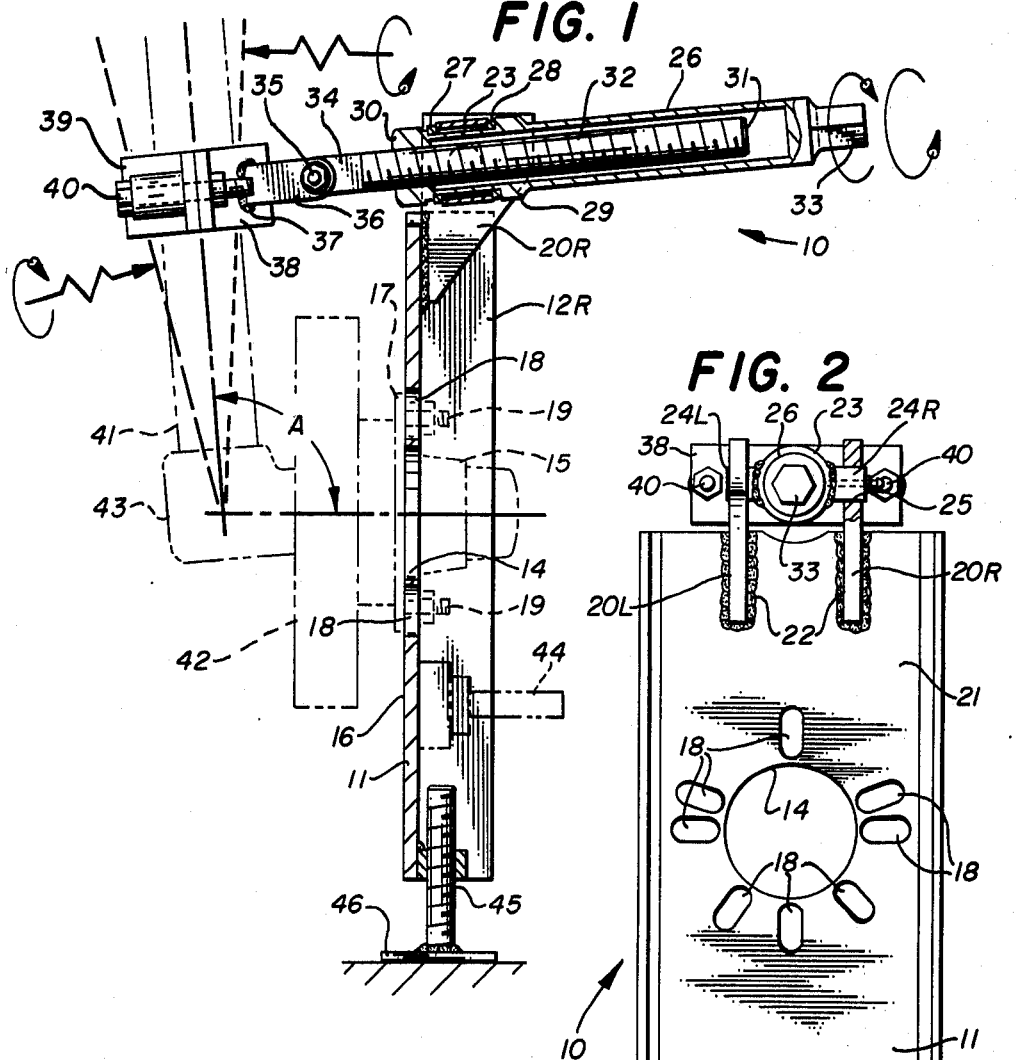

WHEEL MOUNTING SUSPENSION STRUT CAMBER CORRECTING TOOL

This invention relates in general to vehicle wheel mounting and alignment correction tooling and, in particular, to a wheel mounting suspension strut to wheel spindle interconnect camber correction bending tool.

Strut mounting of wheels with independent spring suspension is an effective wheel mounting and suspension, particularly for the front non-drive wheels of vehicles where superior road handling and steering are desired. Wheel strut mountings with an independent spring suspension well known as a "McPhierson strut" occasionally are bent out of proper camber through excessive shock impact to a wheel or by accident. In many instances the wheel mounting strut to wheel spindle interconnect out of camber bent state can be corrected by corrective bending to bring the wheel mounting strut and wheel spindle back to proper camber from either excess positive or negative camber. In the past the damage to a strut was such as to require replacement, particularly when considering the expense of repair with expensive repair tooling required that not many shops could afford to have.

It is, therefore, a principal object of this invention to provide efficient economic camber correction bending repair for wheel mounting suspension strut to wheel spindle interconnects.

Another object is to provide a wheel strut to spindle interconnect camber correction bending tool inexpensive enough that most vehicle repair shops can easily afford.

A further object is to provide such a camber repair tool that bolts to the wheel mounting disk and fastens to the wheel mounting strut that can accomplish corrective camber bending of the wheel strut to spindle interconnect without requiring that the wheel mounting strut be disassembled from the vehicle.

Features of the invention useful in accomplishing the above objects include, in a wheel mounting suspension strut camber correcting tool, a heavy rigid frame channel body with a spindle opening that permits the wheel spindle to extend through and wheel bolt openings to facilitate wheel bolt mounting of the channel body on a strut wheel mounting disk. A reversible direction screw drive assembly is pivotally mounted on the top of the channel body with pivot support in spaced parallel mounting flanges for a rotationally fixed drive screw hub housing member rotationally mounting a drive nut. The drive nut is mounted on one end of a rotational elongate tool drive housing having a wrench tool fitting at the other end. An elongated non-rotational bolt member, that is held in the non-rotational state via attachment of a strut attachment head to the wheel strut, is threadingly drawn back into the elongate tool drive housing or driven outwardly dependent on the rotation of the drive housing and the drive nut attached thereto. This effectively bends the strut and wheel spindle interconnect to correct improper positive or negative camber when a wheel spindle to wheel strut interconnect has been bent out of proper camber setting as by a severe bump or vehicle accident.

A specific embodiment representing what is presently regarded as the best mode of carrying out the invention is illustrated in the accompanying drawing.

In the drawing:

FIG. 1 represents a front elevation view partially cut away and in section of applicant's wheel mounting suspension strut camber correcting tool as placed for bend correcting the camber of a wheel strut and wheel spindle indicated in phantom;

FIG. 2, a side elevation of the wheel strut and wheel spindle camber correcting tool of FIG. 1; and, FIG. 3, a top plan view of the tool of FIGS. 1 and 2.

Referring to the drawing:

The wheel mounting suspension strut camber correcting tool 10 of FIGS. 1, 2 and 3 has a heavy rigid frame channel body 11 such as would be a section of "U" shaped structural beam channeling "U" shaped in cross section such as seen from the top in FIG. 3. The channel body 11 has opposite side flanges 12L and 12R interconnected by a heavy web sheet 13, that is provided with an opening 14 transversely centered and vertically located in the mid region of the channel body 11. Opening 14 is sized to permit respective wheel spindles 15 to extend therethrough when the tool 10 is bolted into place with channel body back face 16 in tight registry against a wheel mounting disk 17. A plurality of radially elongate bolt holes 18 are provided circumferentially around opening 14 in order to facilitate use mounting of the tool 10 on four or five bolt 19 wheel mounting disks 17 through a range of bolt radius circles.

Spaced parallel flanges 20L and 20R are mounted to the top of beam channel inner surface 21 by weldments 22 to extend above the upper end of beam channel 11 and pivotally mount a rotationally fixed drive screw hub housing member 23 with opposite side pivot pins 24L and 24R pivotal in flange openings 25. The housing member 23 rotationally mounts elongate tool drive housing 26 with journal thrust bearings 27 and 28, with the housing including thrust ring 29 welded thereon to receive thrust support from bearing 28 and a drive nut 30 welded to an end thereof positioned to receive thrust support from bearing 27. Elongate non-rotational bolt member 31 threadingly with threads 32 engages drive nut 30 to be driven by rotation of the drive housing 26 and nut 30 directionally in or out, dependent on the direction of nut 30 rotation with the housing 26. A wrench tool fitting 33 is provided on the rear drive end of the elongate tool drive housing 26 to facilitate operator use of the tool in correcting wheel camber. The outer end 34 of the elongate non-rotational bolt member 31 has bolt and pivot assembly 35 interconnect with a flange yoke 36 welded 37 to strut bracket half member 38 that is assembled to strut bracket half member 39 by bolt assemblies 40 to removably clamp attach to a wheel strut 41 of a "McPhierson strut" type independent spring suspension for a front non-drive vehicle wheel.

The center line of the wheel strut 41 and the center line of the wheel spindle 15 should be at a prescribed angle "A" in order that the plane of wheel mounting disk 17 be perpendicular to the wheel supporting surface. When the base of the wheel strut 41 or strut to brake structure 42 and wheel spindle 15 interconnect elbow 43 is bent so that there is undesired positive or negative camber that should be corrected the wrench tool fitting 33 and thereby housing 26 and drive nut 30 is turned clockwise to correct positive camber and counter clockwise to correct negative camber. This draws the bolt member 31 in pulling the wheel strut 41 toward the tool 10 bending the interconnect elbow 43 to lessen the "A" angle and the opposite drive the bolt member 31 out, pushing the strut 41 away from the tool 10, bending the elbow 43 to increase the "A" angle, correcting positive camber and negative camber, respectively. With the vehicle jacked to a level state and the tool channel body 11 drawn to a vertical state through use of the tool 10 an out of camber state is corrected. A removable magnetic based level 44, as indicated in phantom, may be used to indicate when channel body 11 has reached the vertical as the tool 10 is camber bend correcting angle "A". An adjustable height bolt and nut structure 45 with a bottom pad 46 is shown that is useful to help support the heavy tool 10 as it is being bolt mounted on a wheel disk 17.

Whereas this invention is herein illustrated with respect to a specific embodiment thereof, it should be realized that various changes may be made without departing from the essential contributions to the art made by the teachings hereof.

I claim:

1. In a wheel strut to wheel spindle camber correcting tool: a rigid body mountable to a wheel strut wheel mounting disk; mounting means for removably mounting said rigid body to the wheel mounting disk and wheel spindle; reversible direction drive means mounted to the top of said rigid body; pivotal mount means interconnecting said reversible direction drive means and said rigid body; power drive means drive connected to power said reversible direction drive means; and strut connection means on said reversible direction drive means with removable fastening means for connecting said tool to a wheel strut, and with said rigid body tightly mounted on said wheel mounting disk, when said reversible direction drive means is driven applying camber corrective bending forces to the wheel spindle to strut interconnect; wherein said reversible direction drive means comprises a reversible direction screw drive assembly including a rotatably fixed drive screw hub housing member pivotally mounted on said rigid body and an elongate tool drive housing rotatable in said hub housing member carrying a nut adjacent one end of the body; and wherein said reversible direction drive means includes an elongate non-rotational bolt member threadably engaging threads of said nut to be driven by rotation of said drive housing and nut directionally in and out, dependent on the direction of rotation of the nut with the drive housing.

2. The tool of claim 1, wherein said body is channel shaped.

3. The tool of claim 1, wherein said mounting means includes an opening in said body sized to permit a wheel spindle to extend therethrough.

4. The tool of claim 3, wherein said opening is transversely centered and vertically located in the mid region of the body.

5. The tool of claim 3, wherein said mounting means includes a plurality of bolt holes provided circumferentially around said opening for securing wheel mounting disk to said body.

6. The tool of claim 4, wherein said mounting means includes a plurality of bolt holes provided circumferentially around said opening for securing wheel mounting disk to said body.

7. The tool of claim 5, wherein said bolt holes are radially elongated for mounting wheel mounting disks through a range of bolt radius circles.

8. the tool of claim 6, wherein said bolt holes are radially elongated for mounting wheel mounting disks through a range of bolt radius circles.

9. The tool of claim 1, wherein said pivotal mount means includes spaced parallel mounting flanges carried by said body for pivot support of said reversible direction drive means.

10. The tool of claim 1, wherein said housing member carries spaced journal thrust bearings and said elongate tool drive housing carries a thrust bearing ring to receive thrust bearing support from one of said thrust bearings and the other thrust bearing providing thrust support for said nut.

11. The tool of claim 1, wherein said strut connection means on said reversible direction drive means for connecting said wheel to a wheel strut includes a bolt and pivot assembly interconnected to a flange yoke carrying a bracket half member removably securable to a second bracket half member to removably clamp a wheel strut.

12. The tool of claim 1, wherein said strut connection means on said reversible direction drive means for connecting said wheel to a wheel strut includes a bolt and pivot assembly interconnected to a flange yoke carrying a bracket half member removably securable to a second bracket half member to removably clamp a wheel strut, said bolt and pivot assembly being carried by said elongate non-rotational bolt member.

13. The tool of claim 1, wherein said reversible direction drive means includes an elongate non-rotational bolt member threadably engaging said pivotal mount means to be driven by rotation of a drive housing of said pivotal mount means directionally in and out dependent on the direction of rotation of said rotation drive housing.

14. The tool of claim 1, wherein said power drive means includes a wrench tool fitting provided adjacent the end of the elongate tool drive housing opposite said nut.

15. The tool of claim 1, including additional mounting means for mounting and maintaining the body in a vertical orientation.

16. The tool of claim 1, including level means for indicating the limits of application of said camber correction bending forces to the wheel spindle to strut interconnect.

17. The tool of claim 1, wherein said power drive means includes a wrench tool fitting provided adjacent one end of the reversible direction drive means.

* * * * *